Figure 1:
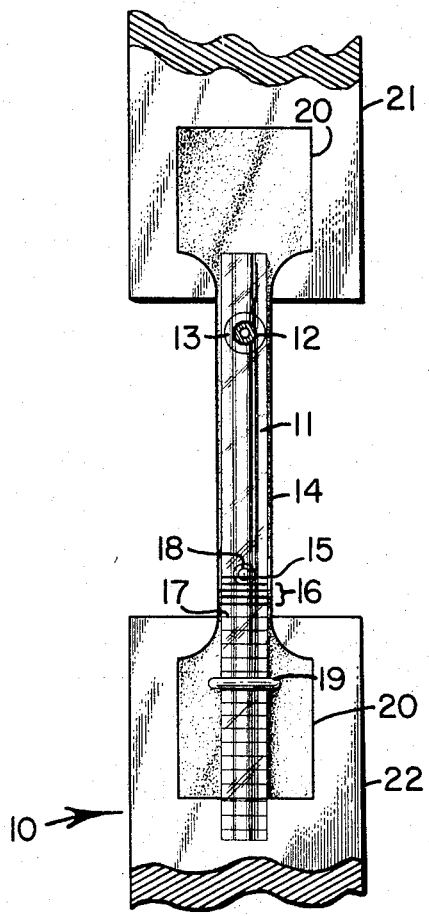

Oct. 3, 1967  J. B. BALDWIN  3,344,660
VACUUM-ATTACHED GAGE FOR MEASURING STRAINS IN
ELASTIC, VISCOELASTIC, AND LOW-MODULUS
PLASTIC MATERIALS
Filed Sept. 28, 1964

John B. Baldwin INVENTOR.

BY *[signature]*

ATTORNEY

United States Patent Office 3,344,660
Patented Oct. 3, 1967

3,344,660
VACUUM-ATTACHED GAGE FOR MEASURING STRAINS IN ELASTIC, VISCOELASTIC, AND LOW-MODULUS PLASTIC MATERIALS
John B. Baldwin, Huntsville, Ala., assignor to Thiokol Chemical Corporation, Bristol, Pa., a corporation of Delaware
Filed Sept. 28, 1964, Ser. No. 399,672
1 Claim. (Cl. 73—88)

This invention relates to improvements in strain gages used in tensile testing and, more particularly, it relates to a new strain gage configuration and a method of attaching the strain gage to a conventional test specimen without introducing detrimental stress concentrations at the point of contact.

Many of the solid propellants that are in use today to provide a propulsion medium for solid propellant rocket motors are formulated from elastomeric materials. Liners and insulations are also made from rubbery materials which must be characterized as regards physical and mechanical properties. All of these materials must be able to withstand sustained elongations without failure under a variety of stress/strain/rate/temperature spectra that might be encountered during the handling, storage, and firing of a solid propellant rocket motor.

Specimens, such as the JANAF "dogbone" tensile specimen, which are made from inert liner and insulation materials and "live" solid propellant slabs, are usually tested to determine such properties as Young's modulus, elastic limit boundaries, amount of strain at maximum stress, amount of strain at rupture, etc., over wide ranges of temperatures and strain rates.

As elongation of the specimen within and from the tensile specimen gripping jaws makes it very difficult to correlate actual specimen elongation with testing machine crosshead displacement, external strain gages are often mounted upon the surface of the test specimen within the necked-down straight section, which is generally thought to be the area of most uniform strain. This defines a gage length and usually permits more accurate measurements of strain at known levels of stress than are afforded by routine crosshead displacement measurements.

One of the problems that has been encountered in associating a strain gage with an elastomeric specimen is the manner in which the strain gage is attached to the specimen. Means whereby the strain gage it attached to the specimen has, in the past, affected the test that has been imposed on the specimen or the strain gage under test has become disengaged from the specimen.

It is an object of the invention, therefore, to provide a strain gage that can be rapidly attached to an elastomeric specimen in such a manner that the means of attachment will, in no way, interfere with or alter the test that is being made on the elastomeric specimen.

Another object of the invention is to provide a strain gage that is simple in construction and is reuseable as well as inexpensive.

A further object of the invention is to provide a strain gage that will not contaminate the specimen in any way during the test.

A still further object if the invention is to provide a strain gage that will not be affected by any prevailing temperatures that exist during the duration of the test.

Figure 2:
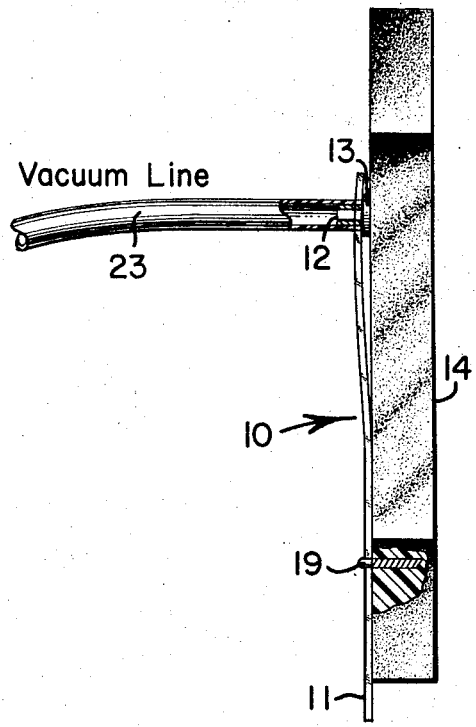

With the above and other objects and advantages in view, the invention consists of the novel details of construction, arrangement and combination of parts more fully hereinafter described, claimed and illustrated in the accompanying drawing in which:

FIGURE 1 is an elevational view, partly broken away, showing the manner in which the strain gage embodying the invention is associated with an elastomeric test specimen, and FIGURE 2 is a side elevational view, partly in section, of the specimen and strain gage embodying the invention, as shown in FIGURE 1.

Referring more in detail to the drawing wherein like parts are designated by like reference numerals, the reference numeral 10 is used to generally designate a strain gage embodying the invention.

The strain gage 10 comprises a strip of clear plastic sheeting 11 which, under usual practice, is approximately ten times as long as it is wide.

Mounted in the strip 11 adjacent one end thereof is a tubular coupling 12 having an enlarged circular head 13 which is adapted to contact the surface of an elastomeric test specimen 14.

Inscribed on the strip 11 precisely 4.0 centimeters distance below the center line of the tubular coupling 12, is a transversely-disposed index line 15. Commencing at a precise distance of 1.0 millimeter below the index line 15 is a series of four equally-spaced gradient lines 16, which are parallel to the index line 15, with precise 1.0 millimeter spacings between adjacent gradient lines 16. Commencing at a precise distance of 2.0 millimeters below the bottommost of the gradient lines 16 is a second series of transversely-disposed gradient lines 17, the number of which may be selected to suit the individual application involved. The second series of gradient lines 17 is also composed of lines which are parallel to the index line 15, with the gradient lines 17 being equally spaced a precise 2.0 millimeters' distance between adjacent gradient lines 17. A small bullseye 18 which is placed on the tensile specimen 14 in the form of a small "dot" of ink, paint, dye, or other suitable marking material is the reference point which is monitored during the test.

A conventional staple 19 is forced into the specimen 14 at a point well within the large tab-end portion of the specimen 14 so that it will extend over and loosely maintain the strip 11 in contact with the surface of the specimen 14. There is sufficient clearance between the strip 11 and the staple 19 to permit the strip 11 to slide easily during the test.

When it is desired to test a specimen with the strain gage 10, the opposite large tab-ends of the specimen 14 are inserted into similarly contoured seats 20 in diametrically-opposed jaws 21 and 22. The jaws 21 and 22 may be connected to an Instron testing machine, or any other suitable mechanism that may be utilized to move the jaws 21 and 22 in opposite directions at a known rate. The lower end of the strip 11 is threaded beneath the staple 19 a distance of about one inch from the lower end of the strip 11. The strip 11 is aligned parallel with the longitudinal axis of the necked-down portion of the specimen 14, with the strip 11 covering virtually the entire surface of the necked-down portion of the specimen 14. The strip 11 is oriented, by sliding it up or down, until the index line 15 is superimposed precisely over the center of the bullseye 18 on the specimen 14. At this point, a vacuum source is turned on which produces a vacuum in a vacuum line or conduit 23 which is connected to the tubular coupling 12. By holding the strip 11 firmly against the specimen 14 so that the index line 15 remains correctly oriented with respect to the bullseye 18, and pressing the tubular coupling 12 gently against the specimen 14, the vacuum created within the conduit 23 will retain the strip 11 in fixed relation to the specimen 14. The relatively large, smooth flat head 13 of the coupling 12 will provide an efficient contact surface with the specimen 14 so that the vacuum within the conduit 23 will be sufficient to adequately hold the head 13 at a fixed point on the surface of the specimen 14. The very small area under the tubular coupling 12 on the surface of the specimen 14 can itself strain without releasing the coupling 12 or introducing detrimental stress concentrations at the surface of the specimen 14.

Since the strip 11 is clear, thin plastic, the bullseye 18 will be easily discernible through the strip 11; and the coupling 12 is fixed against the specimen 14 so that a fixed gage length of 4.0 centimeters is established when the index line 15 is properly oriented with the bullseye 18.

As the jaws 21 and 22 are moved apart, the bullseye 18 moves beneath the strip 11 in a downward direction relative to the index line 15. When the bullseye 18 becomes centered beneath the first gradient line 16, the test operator "pips" the Instron chart manually by closing a switch which sends an electrical impulse to the pen mechanism. This "pip" shows up on the graphical plot being generated and represents a strain level of 2.5 percent at that particular level of stress or load, as the case may be. The second gradient line 16, when centered over the bullseye 18, permits the operator to "pip" the 5.0 percent strain point of the test. As the specimen 14 continues to elongate, the bullseye 18 continues its downward travel and, successively, becomes centered beneath the third and fourth of the gradient lines 16, denoting strain levels of 7.5 percent and 10 percent, respectively. As jaw elongation is no longer of major consequence at higher levels of strain, the additional gradient lines 17 are spaced to provide the test operator with "pip" references at strain levels of 15 percent, 20 percent, 25 percent, and so on to specimen failure, in 5 percent increments of strain level. An average test operator can easily monitor tests conducted at cross head speeds of 0.02 in./min., 0.2 in./min., and 2.0 in./min.; and he can "pip" the recording chart at these speeds with a high degree of accuracy. A good test operator can do as well for a fourth decade of strain rate, a head speed of 20.0 in./min; however, pen response limitations of most existing recorders may contaminate the test data. It should be pointed out here, however, that errors in "pipping" the chart due to operator carelessness, momentary distractions, etc., are not cumulative, since each reference line 16 and 17 is located at its distinct fixed distance from the center line of the point of contact of the tubular coupling 12 and the specimen 14 so, while individual "pips" might be slightly displaced occasionally, most "pips" will represent levels of strain that are quite accurate.

There has thus been provided a strain gage that is attached rapidly, is reuseable, inexpensive to manufacture, and will not contaminate the specimen at the point where it is in contact with the specimen.

It is believed that, from the foregoing description, the manner of use and construction of the strain gage will be apparent to those skilled in the art and it is to be understood that variations in the construction of the strain gage, as well as the use thereof, may be adhered to providing such variations fall within the spirit of the invention and the scope of the appended claim.

Having thus described the invention, what is claimed as new and desired to be secured by Letters Patent is:

A strain gage for elastic materials having indicating marks thereon, comprising a strip of transparent material, a hollow coupling positioned in said strip adjacent one end thereof, means for supplying a vacuum to said coupling to retain it in fixed relation to the elastic material, groups of transversely-disposed gradient marks on said strip of transparent material that are adapted to coact with the indicating mark on the elastic material as strain is imposed thereon, means secured to the material and engaging the strip of transparent material to maintain close contact between the strip of transparent material and the elastic material, said gradient marks being positioned along an axis between the point at which said strip is fixed to the elastic material, the indicating mark on the material and the means engaging said strip, a portion of the longitudinal area of said elastic material varying between the point at which said strip is fixed to the elastic material and the means engaging said strip to provide relative movement between said strip and the elastic material for indicating by means of said indicating mark the strain placed thereon.

References Cited

UNITED STATES PATENTS 1,759,219 5/1930 Bowlus _____ 33—147
2,736,097 2/1956 Coleman _____ 33—107

RICHARD C. QUEISSER, *Primary Examiner.*

JERRY W. MYRACLE, *Examiner.*